(No Model.)
L. L. MALM.
LUBRICATOR.
No. 476,886. Patented June 14, 1892.
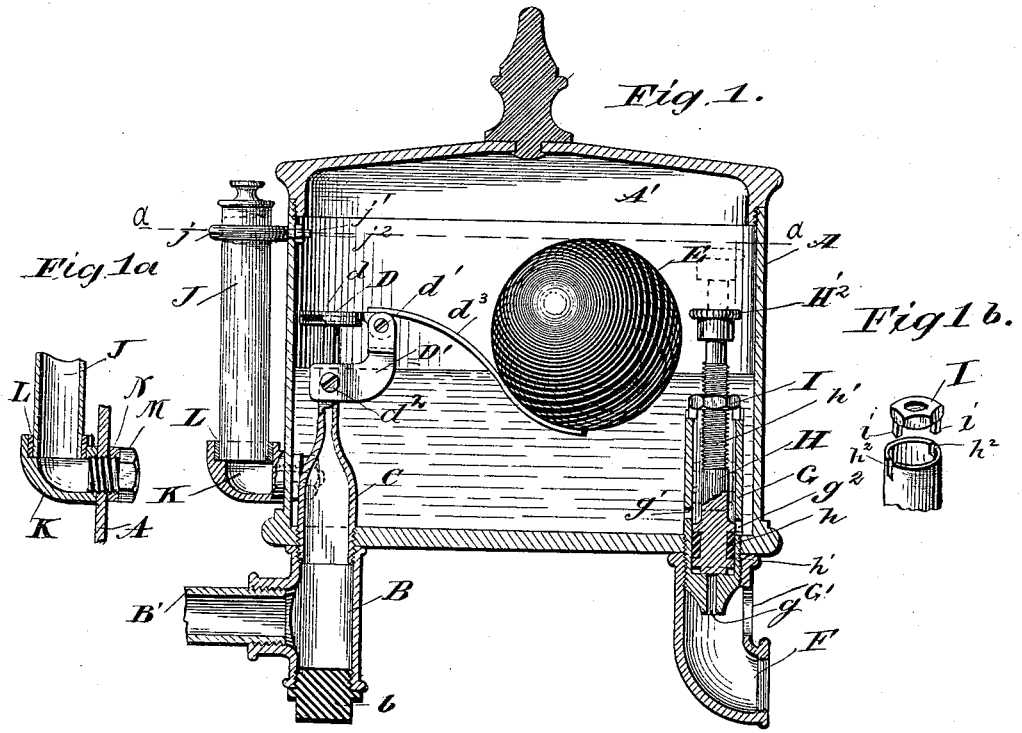
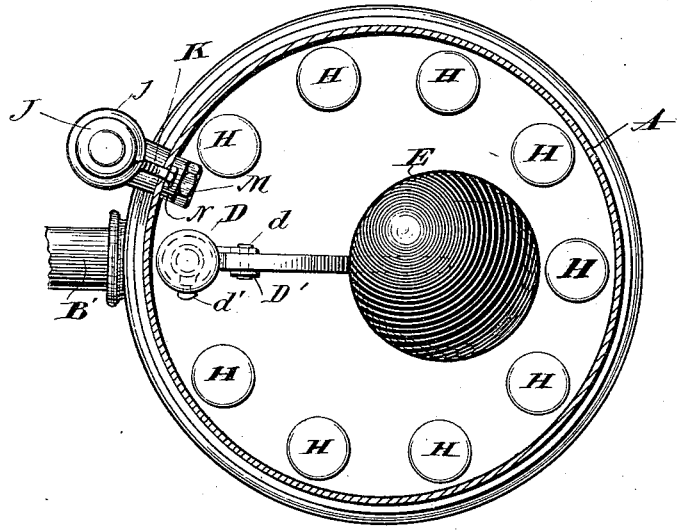
Witnesses
Inventor
Louis L. Malm
by Wm. H. Monroe,
Attorney
THE NORRIS PETERS CO., PHOTO-LITHO., WASHINGTON, D. C.

UNITED STATES PATENT OFFICE.

LOUIS L. MALM, OF CLEVELAND, OHIO.

LUBRICATOR.

SPECIFICATION forming part of Letters Patent No. 476,886, dated June 14, 1892.

Application filed December 1, 1891. Serial No. 413,692. (No model.)

*To all whom it may concern:*

Be it known that I, LOUIS L. MALM, a citizen of the United States, and a resident of Cleveland, county of Cuyahoga, State of Ohio, have invented certain new and useful Improvements in Oil-Cups, of which I hereby declare the following to be a full, clear, and exact description, such as will enable others skilled in the art to which it appertains to make and use the same.

My invention relates to automatic oil-feed cups; and its objects are to prevent hot boxes by a regular and automatic supply of oil.

My invention also includes a multiple system of delivery, whereby many bearings can be lubricated without constant attention.

My invention further consists in the combination and arrangement of parts and construction of details, as hereinafter described, shown in the accompanying drawings, and more specifically pointed out in the claim.

In the drawings, Figure 1 is a vertical central section of an oil-cup embodying the elements of my invention. Fig. 2 is a transverse section on line $a\,a$, Fig. 1. Fig. $1^a$ is a detail in section. Fig. $1^b$ is a detail.

A in the drawings represents the cup, and A' the cap or cover.

B is the feed-inlet for oil, which leads from an elevated reservoir at any desirable height.

C is the inlet-nozzle, which is narrowed at the outlet extremity to prevent the passage of obstructions lodged in the pipe.

D is a cover over the inlet, which when drawn down forms a tight stop to the passage of oil, a leather or other pliable packing being inserted to close the joint, as at $d$.

$d'$ is a pivot in the arm D', clamped at $d^2$ upon the nozzle C and secured by a set-screw. Upon this pivot the cover D is supported by the extension $d^3$, to which the ball-float E is secured. It will be seen that the float E rests upon the surface of the oil in the cup, and by its rise or fall shuts or opens the aperture in the nozzle C, thus maintaining the oil at a uniform level in the cup.

B' is a pipe entering the inlet-tube from the reservoir, and $b$ a plug which can be removed to clean the various parts.

F is an outlet-elbow for discharge, to which the short stand-pipe G is attached, perforated at $g$ for discharge and at $g'$ and $g^2$ for admission. The upper end of the pipe G is open and the plug or piston H is inserted to shut off the flow, when desired. In the figure the plug H is shown as forced down below the openings $g'$ and $g^2$, and the flow of oil is stopped. Packing $h'$ in the recess $h$ makes a perfect joint. In dotted lines the plug H is shown raised for the flow of oil.

The advantage of the two openings at $g'$ and $g^2$ is that in case one should be closed by any obstruction the other can be used to admit oil to the pipe C.

The upper portion of the piston H is screw-threaded and provided with the nut I, which rests upon top of the pipe G, thus retaining the piston at any desired height in the pipe.

H' is a milled head, by which the piston may be turned in the nut I for raising or lowering the piston. To fix the nut so that it will not turn when with the piston, lugs $i\,i$ are cast integral therewith, which rest in slots $h^2\,h^2$ and make lateral movement impossible.

An opening at G' answers the purpose of a sight-feed, in which a glass plate may be inserted, if desired. Through this opening any irregularity in the flow may be detected at once.

J is an indicator-tube extension to the cup, which communicates with the oil-vessel and exhibits the height of the oil.

K is the coupling or elbow, which conveys the oil to the tube, and L is a packing about the base of the tube.

M is a short nozzle, which is inserted from within the cup and screwed into the elbow K. M' is a metal washer to complete the joint. The thinness of the cup-walls necessitates the employment of this form of joint.

I believe myself to be the first to employ a ball-float in connection with an oil-cup to regulate the admission of oil thereto, and also believe myself to be the first to utilize an oil-cup to feed a multiple number of bearings through separate feed-tubes.

The advantages of this device are shown in the extreme economy obtained by a regular feed of oil to the bearings without waste or wear to machinery and the reduction in the labor required to oil so many bearings.

What I claim, therefore, and desire to secure by Letters Patent, is—

The combination, with an oil-cup provided with a narrowed inlet and float-controlled valve therefor, of one or more outlet-tubes, each tube being provided with sight-openings, an interior tube with perforations for admission and discharge of oil, and packed piston for cutting off or admitting oil to the inner tube, substantially as described.

LOUIS L. MALM.

Witnesses:
WM. M. MONROE,
F. H. MOORE.